United States Patent [19]
Moscovita

[11] 3,909,341
[45] Sept. 30, 1975

[54] SPLICING TOOL
[75] Inventor: Peter A. Moscovita, Narragansett, R.I.
[73] Assignee: Owens-Corning Fiberglas Corporation, Toledo, Ohio
[22] Filed: Dec. 12, 1973
[21] Appl. No.: 423,962

[52] U.S. Cl. ................ 156/502; 156/304; 156/306; 156/582; 156/583
[51] Int. Cl.² .......................................... B65H 69/06
[58] Field of Search ............... 29/110, 110.5, 116 R; 156/304, 306, 499, 502, 544, 553, 579, 582, 583; 219/244

[56] References Cited
UNITED STATES PATENTS
1,319,333  10/1919  Harsel ............................ 156/421 X
FOREIGN PATENTS OR APPLICATIONS
734,590  4/1943  Germany ............................ 156/544

*Primary Examiner*—William A. Powell
*Assistant Examiner*—Brian J. Leitten
*Attorney, Agent, or Firm*—Carl G. Staelin; John W. Overman; Paul F. Stutz

[57] ABSTRACT

Abutting edges of various plies wrapped about a tire building drum in the assembly of unvulcanized tire components are spliced together with a hand-held tool which features a pair of freely rotatable, oppositely slanted wheels mounted so that the angular peripheries of the wheels cooperate with the slanted mounting to urge adjacent ply edges together as the wheels are moved straddlingly along and on either side of the two abutting edges; the tool desirably and additionally featuring means for imparting heat to said wheels so that the unvulcanized stock is softened, enhancing the merging together of the stock edges as urged together by the hand pressure transmitted to the stock by the wheels.

11 Claims, 3 Drawing Figures

SPLICING TOOL

The present invention relates to a tool for splicing together edges of a heat-softenable stock material. More particularly, the present invention relates to a tool particularly designed to splice together adjacent edges of vulcanizable elastomeric stock employed in building a tire on a tire building drum prior to vulcanization.

In the manufacture of tires and other rubber products, unvulcanized rubber is calendered, extruded, sheeted and otherwise formed into components of particular configurations. These components are then assembled in the unvulcanized or "green" state whereupon they are subjected to elevated temperature and pressure in a mold to convert the green unvulcanized stock into finished vulcanized rubber products having a shape and configuration corresponding to that of the mold.

In the case of rubber tires, unvulcanized rubber sheets, strips, tapes, carcass plies, belt plies, beads and tread stock are formed by calendering, extruding or the like. All of these components are then successively assembled and combined in proper sequence on a collapsible tire building drum and later molded into ultimate tire configuration. The unvulcanized rubber parts of various configurations are applied onto the drum by a skilled operator who initiates controlled rotation of the tire building drum or cylinder by appropriate foot pedal which actuates the motor and connected gearing to turn and stop the cylinder during which the carcass plies, etc., are assembled in sequence onto the drum. It will be appreciated that the unvulcanized green plies, strips, etc., have edges which should desirably be secured together sincd the ultimate tire is circular. The splicing together of these edges presents a problem for several reasons. In the first place, it must be appreciated that the preform tire, erected and assembled on the tire building drum, is in the form of a cylinder while the tire as viewed in section is of the well-known torus configuration. This is achieved in the molding of the tire by an outward expansion or stretching of the central region of the cylindrical green preform by an innertube-like bag which is a complementary part of the molding apparatus. This bag is inflated and compresses the central region of the cylindrical preform into contact with the interior peripheral surface of the mold defining the tread. This expansion of the tire places considerable stress upon a splice employed to join mating edges of an elongate preform, whether it be a carcass ply or a tread reinforcing belt or a breaker ply or the like.

A carcass ply, of course, as is well known, extends essentially from one edge to the other edge of the drum which generally corresponds to the bead-to-bead dimension in the ultimate tire. Tread reinforcing belts and breaker plies are employed presently in the ultimate tire only in the central or tread region and correspondingly are formed from strips which are quite a bit narrower than the carcass material. Many of the carcass plies are reinforced with natural textile cord or cord of synthetic material such as rayon, nylon, polyester (Dacron) and, as well, glass and metal. The presence of reinforcement cord in, for example, the certain carcass plies and belt plies and breaker plies accentuates the difficulty in stresses upon the carcass or belt ply under expansion. The cord materials are most usually incorporated in and are present in the ply at a bias angle to the axis of the tire building drum or cylinder in order that the cord may accommodate the expansion, which, in turn, places additional stresses on the surrounding unvulcanized elastomeric matrix.

It has been found that the employment of lap splices to join carcass ply edges or belt ply edges are undesirable since the overlapping marginal regions result in a concentration of excess rubber or cord at the region of overlap which imparts to the ultimate tire an eccentric characteristic which imparts a thump to the tire in use. Butt splices, wherein the edges are simply brought into abutting relationship, are and have been used but are subject to pulling apart as the tire is expanded in molding, leaving a discontinuity. This is particularly evident and critical in the case of the tread reinforcing belt plies or breaker strips. The region of discontinuity results in a region of weakness subject to blow-out or otherwise failure of the tire when in use.

With the foregoing introduction, it may be stated that it is an object of the present invention to provide a splicing technique which provides a joining together or splicing of adjacent edges which is secure and superior to any of the splicing techniques known or used heretofore.

It is additionally an object of the present invention to provide a splicing technique which avoids the overlap problem of the lap splice and the discontinuity of the butt splice.

It is a particular object of the present invention to provide a tool designed to be easily operated by an individual and capable of accomplishing the formation of the unique splice joinder as described.

It is also an object of the present invention to provide such a tool device which is relatively simple in construction, relatively inexpensive and relatively trouble-free in terms of operation.

The foregoing as well as other objects of the present invention will become apparent to those skilled in the art from the following detailed description taken in conjunction with the annexed sheets of drawings on which they are presented, for purpose of illustration only, several embodiments of the present invention.

IN THE DRAWINGS

Viewed most simply, the tool of the present invention comprises a pair of electrically heated wheels mounted for rotation in their respective planes which, viewed edgewise, define a V; the wheels having angular peripheral surfaces which permit the wheels to roll along, one on either side; one wheel on one side of one adjacent edge and the other wheel on the other side of the other adjacent prelocated edge. The surface configuration of the wheels urges the material together while the heat temporarily softens the material to cause a more intimate merging together of the rubber stock than would otherwise occur at room temperature. Once the wheels have passed the spliced region, the stock returns to its relatively stiff room temperature condition joined, as it were, to a greater degree than before.

The splice is not a lap or overlap splice but it is what can best be described as a modified butt splice, since the degree of joinder is greater than that achieved by simply putting two edges together and exerting force thereon. Here the plane of the wheels urges each stock edge towards the other stock edge while simultaneously the heat of the wheel is softening the stock for mutual merging together of the stock along the two edges or regions.

In a preferred embodiment, the stock in the upper regions of one edge is caused to flow laterally over the stock in the adjacent edge while simultaneously the stock in the adjacent edge is urged downwardly and laterally under the stock in the first-mentioned edge.

Figure 1:
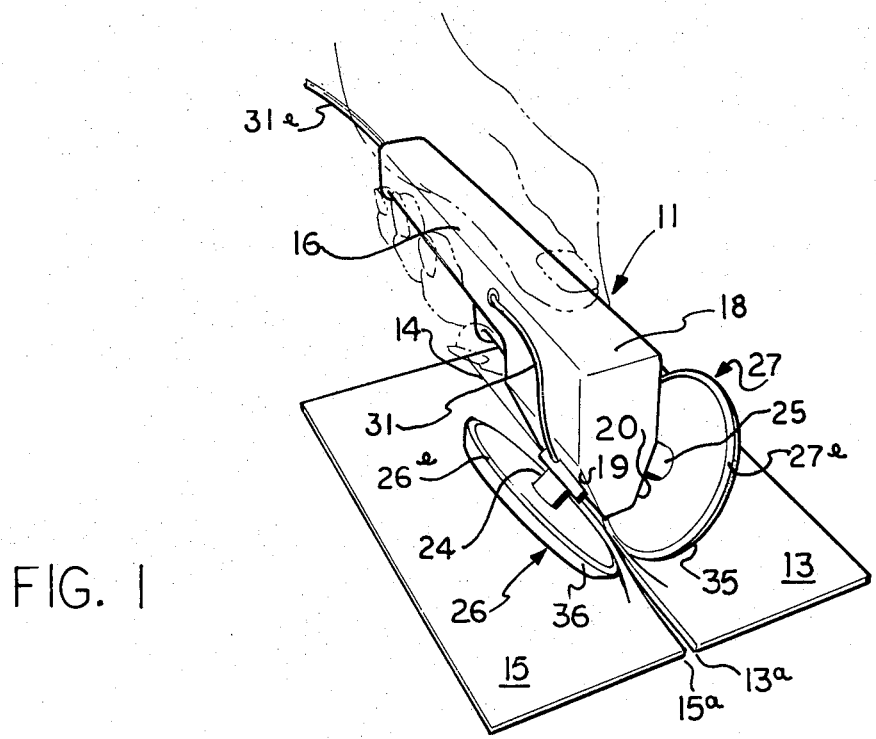
FIG. 1 is a three-quarter perspective view of a tool of the present invention shown in operation, forming a splice between two adjacent edges.
Figure 2:
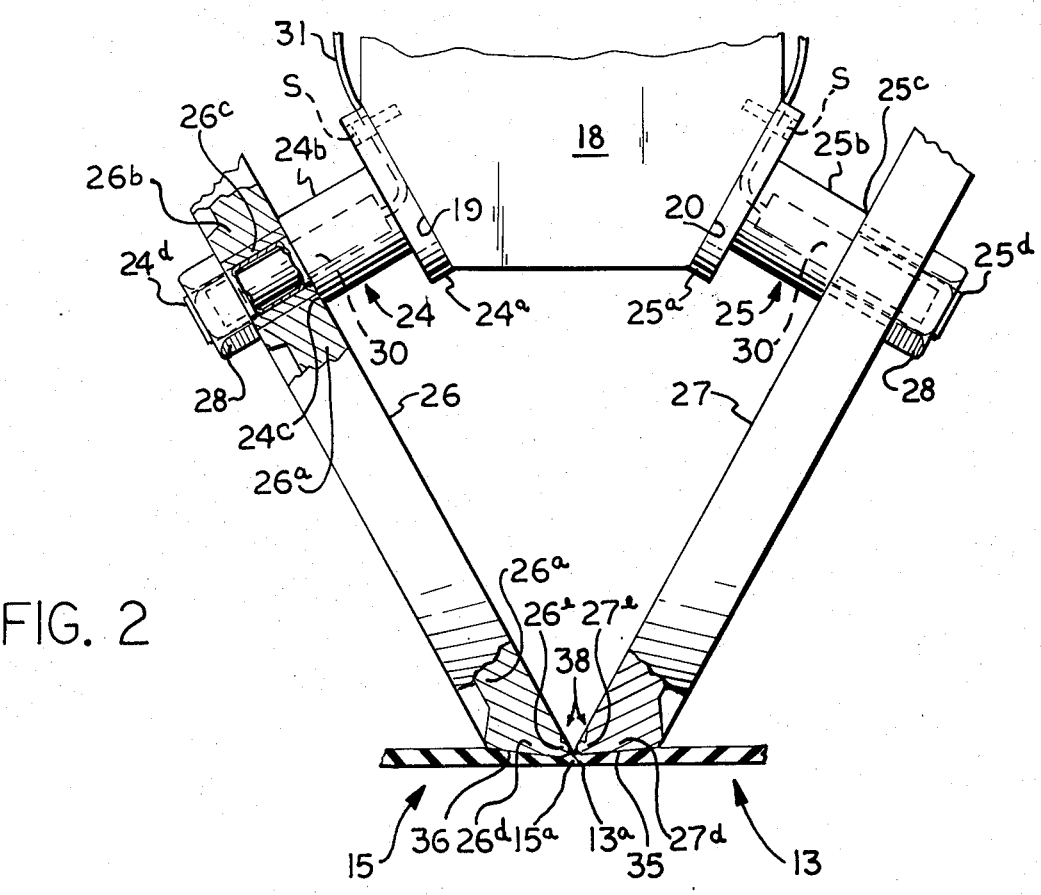
FIG. 2 is a front elevation view of the tool illustrated in FIG. 1 with portions of the tool broken away to show interior structure and also serving to illustrate the formation of the splice.

Referring now more specifically to the drawings, there is disclosed in FIG. 1 the tool, identified by the reference numeral 11, held in the left-hand of the user; the left-hand being shown in dotted outline. Reference numerals 13 and 15 identify the stock material having adjacent edges 13a and 15a which are slightly spaced apart at the fore end of the view and which have been knitted together, as at 14 in the aft or rear end of the view, following passage of the tool 11. The tool 11 features an elongate aft hand-hold end 16 and a fore or head end 18. The head end 18 includes opposed angularly downwardly facing surfaces 19 and 20. Secured to each of the surfaces 19 and 20 are axle members 24 and 25, respectively. The shaft member 24 includes an enlarged cap end 24a which is secured flushly to surface 19 via recessed set screws S. Shaft member 24 also includes an intermediate segment 24b terminating in a shoulder 24c and a smaller threaded terminal end 24d. Shaft member 25 similarly includes an enlarged cap end 25a secured to the facing surface 20 via set screws S, an intermediate smaller diameter region 25b and a threaded reduced diameter end 25d which extends inwardly to terminate in a shoulder 25c. Wheels 26 and 27 are mounted on shafts 24 and 25 and abut against corresponding shoulders 24c and 25c, respectively; the wheels being held on the shafts by threaded nuts 28. The wheel 26 is of reduced thickness in the central web section identified by the reference numeral 26a. The hub portion 26b of wheel 26 is thicker and includes a central sleeve 26c of steel for sliding bearing engagement with the shaft 24. Wheel 27 is similarly constructed. Reference numeral 30 identifies a plug-like 25-watt resistance element which is located on the inside of each of the shafts 24 and 25 and extends for essentially the entire axial length of the shaft, connecting at the mounted end with lead wire 31 which extends rearwardly as at 31e to a suitable source of 110-volt alternating current. Wheels 26 and 27 are fabricated of aluminum which, coupled with the reduced thickness of the major portion of the wheel, permits rapid transfer of heat from the resistance element to the outer periphery of the wheels 26d and 27 d. The mounting of the wheel, including the angular disposition of the face from which the shaft 24 projects, is controlled so that the plane of the wheel as viewed in front elevation is inclined to the horizontal at an angle identified as X° which is desirably maintained at between around 30° to 60°. The angle of the shaft 24 axis with respect to vertical is accordingly likewise desirably within from about 30 to 60°. The outer peripheral surface of the wheel is slanted or chamfered to define an angle of from 30° to 60° with the plane of the wheel 27. The counterpart wheel 26 is very similarly fabricated and mounted so that the wheels in concert provide side-by-side peripheral surfaces identified as 35 and 36. With the construction as just described, hand manipulation of the tool 11 in the manner illustrated in FIG. 1 with the inclined wheels 26 and 27 straddling the adjacent edges 13a and 15a, coupled with the exertion of a slight downward pressure with the thumb, will result in a pressure being exerted by the respective surfaces 35 and 36 upon these adjacent edges, urging them together as the wheels travel linearly along the path defined by the adjacent edges. In accordance with a preferred embodiment of the present invention, the wheel 26 is fabricated to have a peripheral surface of slightly larger diameter than that of the wheel 27 so that it projects radially outwardly an extent slightly more than that of the wheel 27. This phenomena is shown in the sectional view (FIG. 2). Additionally, both wheels, in accordance with the preferred embodiment, include on the inner peripheral region or rim an annular groove 38, as shown, and just radially outwardly a slight bead 26e and 27e. The bead 26e of wheel 26 slightly underlies the bead 27e of wheel 27. As a consequence of this preferred construction, the material in adjacent edge 15a will be moved slightly underneath the corresponding material in edge 13 a; the latter being urged laterally over the material of edge 15a. This modified butt splice has, as can thus be seen, some of the attributes of a lap splice without there being a complete overlap as such has been determined necessarily avoided for reasons explained hereinbefore.

Accentuating the movement of the elastomeric material in the adjacent edges is the elevated temperature imparted to the stock, e.g., elastomeric material, by the heat in the respective wheels induced by the plug resistance elements 30 inside. The elevation of the temperature of the stock, albeit only a small amount, lowers the viscosity of the stock, permitting the flow of the material in the respective adjoining edges in the manner described hereinabove including, it is theorized, some actual intermixing or merging together of the stock material. The pair of wheels can be moved straddlingly along the adjacent edges fairly rapidly by reason of the heat provided by the 25-watt resistance element and the rapid transfer of this heat radially outward in and through the thin wheel section to thereby accomplish the bonding or welding together or mergement of the material. Finally, once the wheels have passed, the stock will become cooled by the ambient prevailing conditions, causing the stock viscosity to increase to a stiffer level, freezing, as it were, the degree of flow and merging together that has been accomplished at the elevated temperature.

Figure 3:
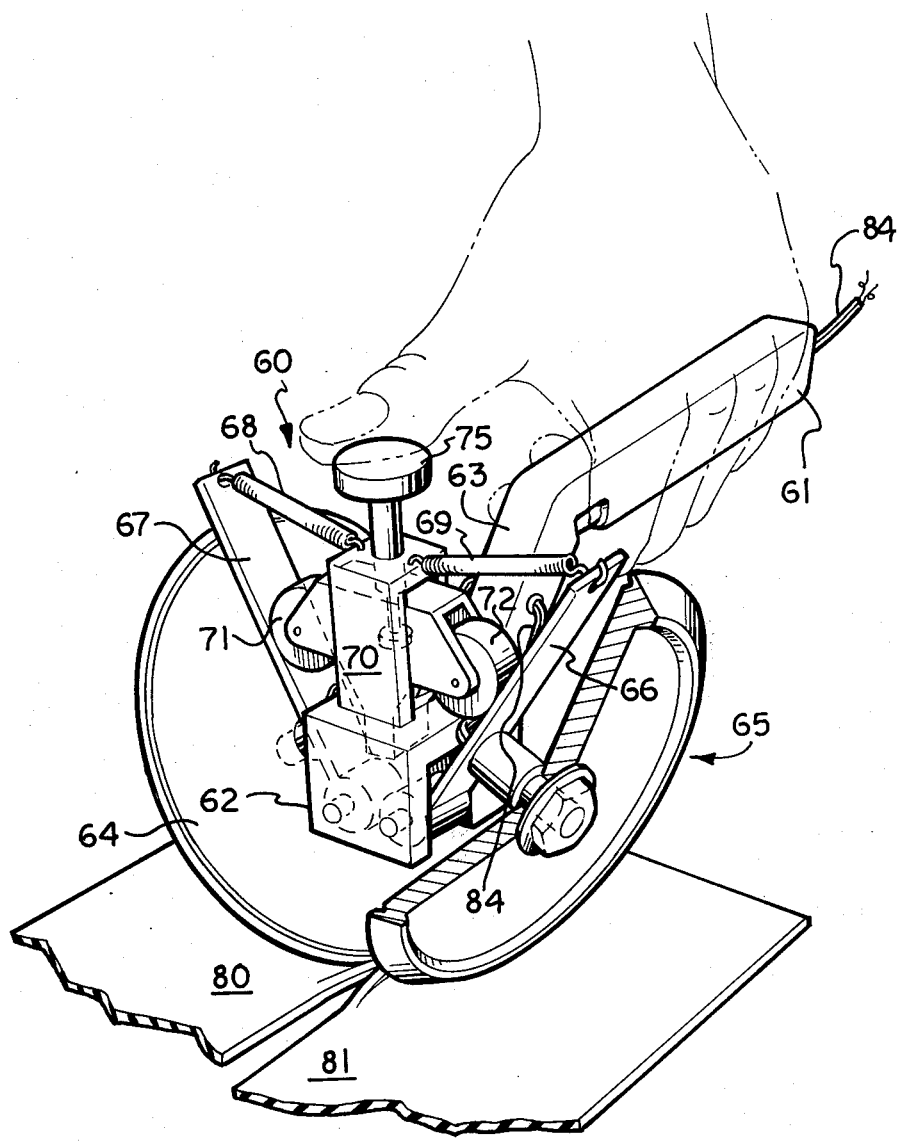
FIG. 3 is a perspective view of a tool with parts broken away to show the interior structure of a tool representing a more sophisticated embodiment of the present invention featuring adjustability.

Reference to FIG. 3 will reveal a further embodiment of the present invention as present in a tool 60 featuring a hand-hold end 61 adapted to be gripped by the fingers (shown in dotted outline) and a connected head 62 somewhat lower than the hand-hold end 61 and connected thereto by downwardly inclined connector 63. A pair of wheels 64 and 65 are mounted on shafts for free rotation; the shafts being secured in wing arms 66 and 67, pivotably mounted in the head 62 as shown, held by springs 68 and 69, connected respectively to the upper terminal ends of the wings and to the bifurcated slide bar 70. The slide bar 70 carries outrigger wheels 71 and 72 which roll on the inner surfaces of the wings 66 and 67 responsive to thumb pressure on the thumb control 75 which is connected to the slide bar 70, mounted slidably in head 62. The wheels have the same structure as the wheels in the embodiment of FIGS. 1 and 2, including the electrical resistance element in the axial connected via wires 84 extending as shown and thence out the rear part of the handle 61 to a suitable source of current. In operation, the tool is held as shown with the wheels straddling abutting edges 80 and 81. Hand manipulation of the tool to cause the wheels to move, as indicated, straddlingly along the edges, coupled with a predetermined pressure on the thumb control 70, will cause the transmission of this force to be exerted through the slide member 70 to the wheels 71 and 72, causing the wing members to move outwardly against the pressure of the spring. This will cause the periphery of the wheels closest to the edges to exert a pinching lateral force on the stock as necessary to meet the resistance of the stock which will, of course, depend upon the durometer of the unvulcanized stock, the ambient temperature conditions, the thickness of the stock and perhaps the degree of loading with reinforcement or filler material. The thumb movement and the heat is found to cooperate in merging the stock together, creating a suitable bond or merging together. The wheel movement provision as described allows considerable flexibility and latitude as to the utility of the tool 61 for different stocks of variant composition and variant dimension. The springs urge the wing members to a neutral position upon relaxation of thumb pressure on thumb knob 75. This, in turn, allows the wheels to assume a less slanted inclination with the wheel peripheries moving further apart at the base of the tool.

From the foregoing description, it can be seen that the tool of the present invention is uniquely functional in providing for the exertion of appropriate forces and pressures onto the adjacent edges of tacky, vulcanizable rubber-like materials to accomplish a splicing together or bonding of the material in the two adjacent edges. The tool provides a novel combination of wheel inclination, surface configuration of wheel periphery, heat transmissibility and manipulatability as to provide the user with a device which can be easily employed to accomplish the desired purposes. The prime application for the tool described herein is in the splicing together of the abutting edges of plies wrapped about a tire building drum in the course of the assembly of the various vulcanizable plies, liners, beads, chamfer strips, belt plies, breaker strips and tread stock or camelback member, as go to make up the green unvulcanized tire preform of generally cylindrical configuration. It will, on the other hand, be appreciated that the tool of the present invention will find a wider scope of application in the field of rubber, plastics, coated textiles and related arts. Most of the mentioned arts involve assembly of multiple components wherein splices and the like are desirable and necessary to effect a temporary or permanent bonding or securement of these representative materials along two adjacent or abutting edges.

The heating feature of the tool of the present invention is of particular utility in connection with materials which soften under the influence of heat and are therefore more easily subject to some flow or movement as urged by the pressure and the direction thereof as controlled by the wheel angle and surface configuration.

The specific contour of the wheel peripheries achieves a splice which has the tenacity of a lap splice without the attendant unevenness.

Alternate methods and techniques of joining candidate materials will readily suggest themselves to those employed and working in the fields of endeavors described hereinabove or related thereto.

It is, of course, intended that the invention herein concerned be of relatively broad scope and not limited to the specific disclosure and features of construction disclosed; rather the invention should be broadly construed to include variant techniques and tool structures of similar and equivalent function unless the practice and the structure would be violative of the claims appended hereto.

I claim:
1. A tool for splicing together abutting marginal edges of heat-softenable material desirably joined, secured or bonded together, said tool comprising:
   1. a handle, including a hand-hold end and a head end,
   2. a pair of wheels rotatably mounted dependingly in said head end, said wheels being equally oppositely inclined to define an included angle of 60° to 120°, said wheels each having an outer peripheral surface adapted to contact the margins of said material, thereby urging said edges together as said handle is manipulated to roll said inclined wheels along said margins on either side of said line,
   3. means for electrically heating said wheels, said means being mounted proximate said wheels and,
   4. means for inducing flow of electricity in said means whereby the heat of the wheels temporarily softens the material to thereby improve mixing of the respective materials in said marginal edges while gradual cooling thereafter hardens and fixes the splice.

2. A tool as claimed in claim 1, wherein said wheels are mounted on shafts defining an included angle of from 60° to 120°.

3. A tool as claimed in claim 2, wherein said wheels have outer peripheral surfaces which define angles with the plane of their respective wheels which are complementary with respect to the angles of the plane of said wheels.

4. A tool as claimed in claim 3, wherein the inner facing rims of said wheels include an annular groove.

5. A tool as claimed in claim 4, wherein said inner facing rims include an annular bead contiguous to but radially outward from said groove.

6. A tool as claimed in claim 5, wherein one of said wheels is of slightly larger diameter than the other.

7. A tool as claimed in claim 1, wherein one of said wheels is of slightly larger diameter than the other.

8. A tool as claimed in claim 7, wherein said wheels each include an inner facing rim having an annular groove therein.

9. A tool as claimed in claim 8, wherein said inner facing rims include an annular bead contiguous to but radially outward from said groove.

10. A tool as claimed in claim 1 which includes a pair of pivotable mounting arms pivotably mounted in said head end, means for mounting said wheels on said pivotable arms and thumb actuable roller means contacting said mounting arms and adapted to thereby pivot said arms to change the relative angular relationship between said arms and consequently said wheels, responsive to movement of said roller means.

11. A tool as claimed in claim 10 which includes spring means connecting the free ends of said mounting arms.

* * * * *